(12) United States Patent
Gerwig et al.

(10) Patent No.: US 9,207,706 B2
(45) Date of Patent: Dec. 8, 2015

(54) GENERATING MONOTONICALLY INCREASING TOD VALUES IN A MULTIPROCESSOR SYSTEM

(71) Applicant: INTERNATIONAL BUSINESS MACHINES CORPORATION, Armonk, NY (US)

(72) Inventors: Guenter Gerwig, Simmozheim (DE); Christian Jacobi, Poughkeepsie, NY (US); Frank Lehnert, Weil im Schoenbuch (DE); Chung-Lung K. Shum, Wappingers Falls, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 362 days.

(21) Appl. No.: 13/905,772

(22) Filed: May 30, 2013

(65) Prior Publication Data

US 2013/0326256 A1 Dec. 5, 2013

(30) Foreign Application Priority Data

May 30, 2012 (GB) .................................. 1209548.5

(51) Int. Cl.
*G06F 1/12* (2006.01)
*G06F 1/14* (2006.01)
*G05F 1/573* (2006.01)

(52) U.S. Cl.
CPC .. *G06F 1/12* (2013.01); *G06F 1/14* (2013.01); *G05F 1/573* (2013.01)

(58) Field of Classification Search
None
See application file for complete search history.

(56) References Cited

U.S. PATENT DOCUMENTS

| | | | |
|---|---|---|---|
| 7,681,064 B2 | 3/2010 | Engler et al. | |
| 2003/0101365 A1* | 5/2003 | Elko et al. | 713/500 |
| 2006/0031702 A1 | 2/2006 | Jardine et al. | |
| 2008/0071502 A1* | 3/2008 | Check et al. | 702/186 |
| 2009/0300401 A1 | 12/2009 | Engler et al. | |

FOREIGN PATENT DOCUMENTS

| | | |
|---|---|---|
| EP | 0267612 A2 | 5/2008 |
| JP | S59114664 A | 7/1984 |

* cited by examiner

*Primary Examiner* — Paul Yanchus, III
*Assistant Examiner* — Joshua Neveln
(74) *Attorney, Agent, or Firm* — Margaret McNamara, Esq.; Blanche E. Schiller, Esq.; Heslin Rothenberg Farley & Mesiti P.C.

(57) ABSTRACT

Generating monotonically increasing time-of-day values in a multiprocessor system is provided. Synchronization impulses are received by a processor of the multiprocessor system, and an execution of a read instruction of a time-of-day value within a processor of the processors is refused, if the execution of the read instruction of the time-of-day value is requested after a predefined time after a synchronization impulse of the synchronization impulses, and if a trigger signal, indicative of new data received by a related memory system, has been received after the predefined time, wherein the memory system is external to the processor.

20 Claims, 4 Drawing Sheets

100

102 generating synchronization impulses for all processors of the multiprocessor system 104 refusing an execution of a read instruction of a TOD value based on a joint condition

GENERATING MONOTONICALLY INCREASING TOD VALUES IN A MULTIPROCESSOR SYSTEM

PRIOR FOREIGN APPLICATION

This application claims priority from United Kingdom patent application number 1209548.5, filed May 30, 2012, which is hereby incorporated herein by reference in its entirety.

BACKGROUND

One or more aspects of the invention relate generally to a method for generating TOD (time-of-day) values. One or more further aspects relate to a TOD synchronization system, a computing system, a data processing program, and a computer program product.

Today, computers or computing systems may include a plurality of processors, each of which is capable of executing one or more programs to digitally process a set of instructions as part of a computer program. Certain programs require exact time information for proper performance. This time information is particularly called time-of-day ("TOD"). In particular, a synchronization of monotonically increasing timestamps is important. It is to be avoided that different processors may generate non-monotonically TOD values. Sometimes recorded TOD values are required by software applications, e.g., full recording financial transactions. E.g., TOD clock records are commonly used to prevent financial transactions from being executed simultaneously multiple times against the same funds.

Thus, the software relies on the TOD to be unique and strictly monotonically increasing. E.g., in the S/390 architecture, an instruction called "STORE CLOCK" or "STCK" may be used to record a TOD in a 64-bit (eight byte) field. For uniqueness reasons of the TOD value across a multiprocessor system, the low n bits may be replaced by a constant unique CPU (central processing unit) number. A pulse may be distributed synchronously through the entire multiprocessor system, such that bit 64-n of a counter may be increased. In a 128 way multiprocessor system, seven bits are required to differentiate their 128 CPUs of the multiprocessor system. Thus, 64–7 bits are left for the counter, resulting in bits 0:56, speak, zero to 56. When a CPU reads the TOD it "sees" the current value of the TOD on bits 0:56 and the unique CPU number on bits 57:63, wherein the most significant bit is bit zero. A subsequent read may be blocked until the time pulse has increased bit 56 of the TOD counter. This ensures (a) uniqueness of processor identifiers across the entire processing system (every CPU uses a different bit combination of the bits 57:63), and (b) it may ensure a monotonically increase of the TOD values within each CPU.

However, the increasing number of processors in multiprocessor systems requires an increasing number of bits for identifying a specific CPU. Thus, the remaining bits available for the TOD counter decrease if the 64 bits in total remain unchanged. This means that the accuracy of the TOD counter—because of the reduced number of available bits for the TOD counter—is decreasing. In addition to that the clock speed of the individual processors may be increased. This situation may lead to a conflict of TOD values generated by different processors of the multiprocessor system—the TOD may no longer monotonically be increased.

The following situation may point to the increasing problem: Both, CPU A and B, receive regular TOD impulses. CPU B executes a STCK at time T1, and is writing a TOD value to a memory external to both CPUs, e.g., a shared cache. If shortly after T1, CPU A also executes a STCK instruction, its TOD value may be lower than the value that has been written to the shared memory by CPU B because of the unique CPU number stored in bits 57:63 of the TOD value. The identifier of CPU B may have a lower number than CPU A so that the TOD value of CPU B may be lower even if bit 56 (see above) is identical for both CPUs. This would lead to a non-monotonically increasing TOD of the multiprocessor system, which is to be avoided. However, this may only happen if the time required to transport a TOD value from one CPU to another is shorter than the precision of the TOD counter in a CPU. Now, this counter has a decreasing number of bits available, as discussed above. Hence, TOD value conflicts may arise.

There are some disclosures related to methods for generating TOD values.

Document U.S. Pat. No. 7,681,064 B2, which is hereby incorporated herein by reference in its entirety, discloses a system, a method and a computer program product for steering a time-of-day (TOD) clock for a computer system having a physical clock providing a time base for executing operations that is stepping to a common oscillator. The method includes computing a TOD-clock offset value to be added to a physical clock-value to obtain a logical TOD clock-value, wherein the logical TOD clock-value is adjusted without adjusting a stepping rate of the oscillator.

BRIEF SUMMARY

Therefore, there may be a need to overcome TOD conflicts between an increasing number of CPUs within a multiprocessor system with increased CPU clock speed and improved cache latency.

This need may be addressed by a method for generating TOD values, a TOD synchronization system, a computing system, a data processing program, and a computer program product, according to one or more aspects of the independent claims.

According to one embodiment, a method for generating TOD values is provided. The method may comprise receiving synchronization impulses—in particular, periodic synchronization impulses from a dedicated PLL (phase-locked-loop), specifically for TOD impulses generated for all processors of the multiprocessor system—and refusing an execution of a read instruction of a time-of-day value within a processor of the multiprocessor system, if the execution of the read instruction of the time-of-day value is requested after a predefined time after a synchronization impulse of the synchronization impulses, and if a trigger signal, indicative of new data received by a related memory system, has been received after the predefined time, wherein the memory system is external to the processor.

According to another embodiment, a TOD synchronization system is provided, in particular, a time-of-day synchronization system for generating monotonically increasing time-of-day values in a multiprocessor system. The system may comprise an input unit adapted for receiving synchronization impulses, in particular, those TOD synchronization impulses that are generated for all processors of the multiprocessor system, and a refusing unit adapted for refusing an execution of a read instruction of a time-of-day value within a processor of the processors, if the execution of the read instruction of the time-of-day value may be requested after a predefined time after a synchronization impulse of the synchronization impulses, and if a trigger signal, indicative of new data received by a related memory system, has been received after the predefined time, wherein the memory system is external to the processor.

It may be noted that the trigger signal may indicate a TOD value that may have been written to a memory system or shared cache by another processor.

It may also be noted that today typical TOD impulses may be in a range of 62.5 ns versus a clock speed of the processors of about 200 ps (pico second). It may also be noted that the mentioned "STCK" instruction may read the TOD value from a TOD unit within each processor and may write it to a memory, external to the processor, e.g., a cache, which may be shared between several processors, e.g., a shared L2 or L3 cache, or higher. Thirdly, a read of a TOD value may no longer be refused if a new TOD impulse may have been received.

BRIEF DESCRIPTION OF THE SEVERAL VIEWS OF THE DRAWINGS

Embodiments of the invention will now be described, by way of example only, and with reference to the following drawings.

DETAILED DESCRIPTION

Figure 1:
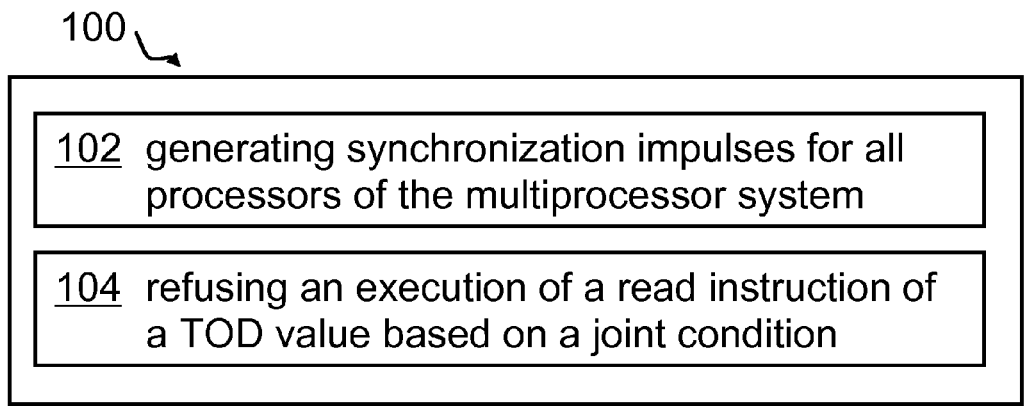
FIG. 1 shows a block diagram of an embodiment for generating monotonically increasing time-of-day values.

The synchronization for TOD purposes between the processors may be performed by periodic synchronization impulses from a dedicated PLL (phase-locked-loop) generator, specifically for TOD impulses. It may also be useful to recognize that the trigger signal indicative of new data received in a shared or cache memory external to the processor may signal that another CPU may have written a TOD value to a shared memory. But, it may also be another value of something else.

In the context of this application, the following conventions may be followed:

Multiprocessor—The term multiprocessor may indicate a processor comprising several CPUs, kernels or processing units. All CPUs may operate and execute different program codes independently. However, they also are to be synchronized, in particular, in terms of their TOD signals. Typically, all CPUs may receive the same system clock signals, i.e., they may all operate with the same base clock. However, TOD synchronization impulses and clock impulses may be completely different. Typically, the clock speed is much faster than TOD impulses.

Time-of-day values—A TOD value typically consists of a TOD counter having a certain granularity, i.e. a dedicated number of bits, and a unique CPU number. This term may denote unique time signals. The TOD values should be monotonically increasing. This may mean that a TOD value written at a time T1 should be lower than a TOD value of a time T2 if T1<T2.

Synchronization impulse—The term synchronization impulse may denote a regular impulse generated by a dedicated clock circuit and fed to all TOD counters in each processor of the multiprocessor system. Typically, a specific PLL circuit may be responsible for generating these regular synchronization or TOD impulses.

Trigger signal—The term trigger signal may denote a signal that may be sent out on a certain condition. E.g., a cache memory system may issue a trigger signal, if any data stored in the cache memory may have been changed. In another example, the cache memory may have received new data. However, these data may be identical to the data stored before. These data may also include a TOD value that may have been written by another processor to the shared cache memory.

Shared cache—The term shared cache may denote a memory system to and from which several processors, cores or processing units may write or read data values. Thus, a shared cache may be jointly accessible by the processors, in particular, in a multiprocessor system.

TOD counter—The term TOD counter may denote a counter that may be implemented within each CPU of the multiprocessor system. It may increase its value—namely its count—on every signal of the synchronization impulses. The TOD counter may be able to generate time marks with every impulse the TOD counter receives. Two successive TOD values may indicate the smallest amount of time that may be distinguishable by an application program using the processors of the multiprocessor system.

Counter—The term counter may denote a counting unit that may increase its value stored in it by impulse, e.g., a clock impulse. It may be differentiated from the TOD counter.

Reject flag—The term reject flag may denote a flag that is set in order to avoid a reading of a TOD counter value or simply TOD value.

One or more aspects of generating TOD values may offer a couple of advantages:

One or more aspects of the provided method and the related system may guarantee that not any two processors in a multiprocessor system may generate identical TOD values at different times. A count of a synchronization impulse may be restricted to longer and longer time periods because in a TOD value, restricted to a 64-bit word, more and more bits may be reserved for identifying an increasing number of processors. A new added interlock mechanism between the TOD logic and the cache logic may monitor when a processor is observing data changes or newly received data in a shared cache memory. Such a data change, or receipt of new data, may potentially be a result of a STCK instruction of another processor, wherein the STCK instruction is both, a read and a write operation, in particular, a read from the TOD unit and a write to the memory. By one or more aspects of the provided mechanism, the reading of the TOD—and thus, the writing of a TOD value to the shared cache memory—is deferred until a new TOD impulse has been received.

Hence, one or more aspects of the proposed method prevent one CPU observing, that is reading from cache, a TOD, storing it, transferring an indication of the TOD-observation to another CPU, then observing the TOD of the other CPU, all while no increase of the TOD counter happens.

According to one embodiment, the predefined time is determined based on a smallest latency, a data value—e.g., a potential TOD value—is transferable from one processor to another processor in the multiprocessor system. Such a transfer may be performed using an L2, L3 or higher (L=level x) shared cache memory, to which both involved processors may have write access.

Another embodiment further comprises increasing a counter, e.g., within the processor—on every processor cycle time and resetting the counter, e.g., to zero, upon reception of a synchronization impulse. A skilled person understands that the period of the processor cycle time is different, in particular shorter if compared to the period of the synchronization impulses. Thus, the processor operates at a higher frequency than the synchronization impulses may be generated. In the above mentioned example, the synchronization impulse may be, e.g., 62.5 ns, while the processor cycle time may be, e.g., about 200 ps or less. The resetting may be performed to a value of zero, such that after each reset of the counter, the counter may start from zero with its count and increase its count on every impulse from the processor clock.

According to again another embodiment, a time flag may be set if a time after the synchronization impulses may be reached that is equal or greater than the predefined time. The predefined time is system dependent, e.g., dependent on parameters like CPU type, technology used, processor clock, cache latency, synchronization clock, number of processors, etc. In other words, this time flag may be set according to the following: if the execution of the read instruction of the time-of-day value is requested after a predefined time after a synchronization impulse of the synchronization impulses. It represents one part of the condition defined.

According to an alternative embodiment, the flag may be reset, e.g. to zero, upon reception of a synchronization impulse. Such a reset may symbolize the opening of a new time window. It may also symbolize that the first part of the above mentioned "if" condition has been reset.

According to one embodiment, the memory system or shared cache is jointly accessible by the processor and another processor in the multiprocessor system. A data change in the memory system, i.e., reception of new or identical data, may, in particular, be a TOD value from another CPU. The memory system may, in particular, be a L2, L3 or higher shared cache assessible from two involved processors of the multiprocessor system. A single data value change, i.e., also a re-receipt of an existing data in the cache memory, may trigger the trigger signal.

In a further embodiment, a reject flag may be set if the time flag may have been set and the trigger signal may have been received. This conditional setting of a reject flag may help to control the combined setting of the conditions as set forth in the general concept of the technique. It may guarantee that a reception of the trigger signal may not be forgotten after the trigger signal has been received and before a new synchronization impulse has been received. An actual reading of the time-of-day value may be refused if the reject flag is set. Thus, also the execution of a write of a TOD value may be suppressed if the read and the write part of a "STCK" instruction may be strictly linked to each other.

According to a further embodiment, the execution of the read instruction of a time-of-day value may be rejected if the reject flag is set. This feature allows for a comparable elegantly implementable design of related hardware circuits. Only a check of a set flag is required in order to stop a read of a time-of-day value to avoid internal system conflicts.

In a further embodiment, the reject flag may be reset upon reception of the synchronization impulse. Thus, a reception of a synchronization impulse resets the complete method for generating monotonically increasing time-of-day values in a multiprocessor system or a related time-of-day synchronization system. Everything is back to normal and the cycles may start again.

In one embodiment, the read instruction of a time-of-day value may also include a write instruction of a time-of-day value. If a TOD read and write instruction—e.g., to a related cache memory—may be combined into one instruction, the total time for an execution of the complete instruction may be reduced. Also, from a programming point of view, there may be advantages. The writing of the TOD value may be directed to a related cache that may be related to the processors of the multiprocessor system. The combined instruction may be a "STCK" instruction, as discussed above.

In the following, a detailed description of the figures will be given. All instructions in the figures are schematic. Firstly, a block diagram of an embodiment for generating TOD values is given. Afterwards, further embodiments of the method and the TOD synchronization system will be described.

FIG. 1 shows a block diagram of an embodiment of the method 100 for generating monotonically increasing time-of-day values in a multiprocessor system. The method 100 comprise generating, 102, synchronization impulses for all processors of the multiprocessor system, and refusing, 104, an execution of a read instruction of a time-of-day value within a processor of the processors if the execution of the read instruction of the time-of-day value is requested after a predefined time after a synchronization impulse of the synchronization impulses, and if a trigger signal indicative of new data received by a related memory system, has been received after the predefined time, wherein the memory system is external to the processor.

Figure 2:
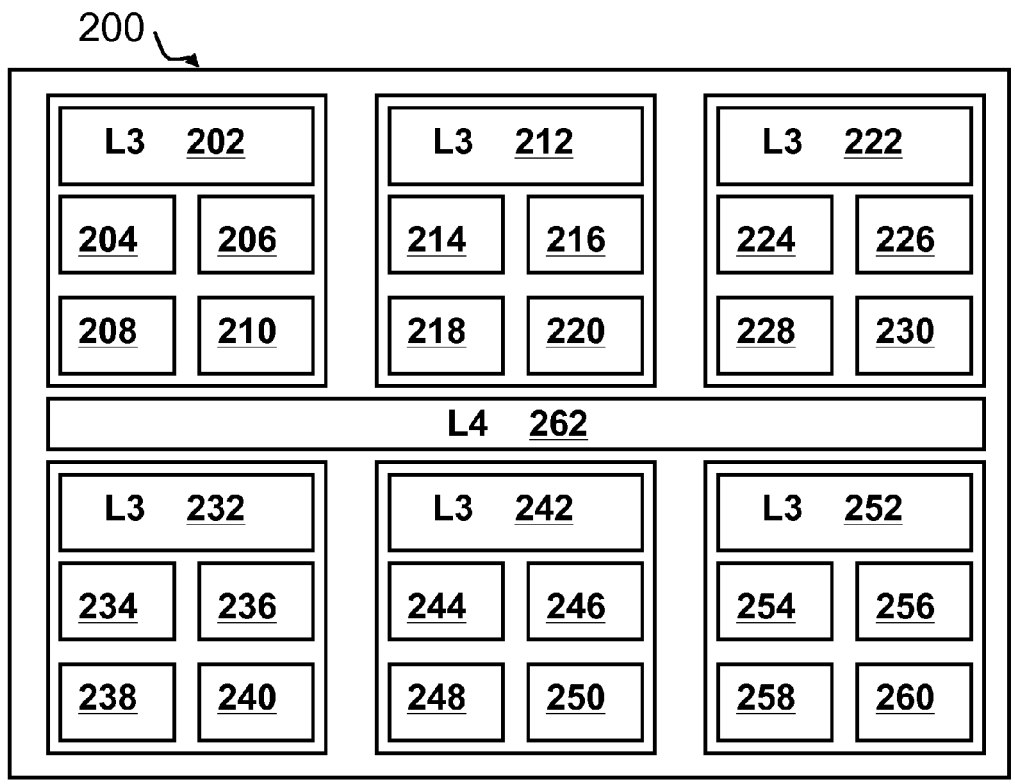
FIG. 2 shows elements of a multiprocessor system.

FIG. 2 shows an embodiment of a multiprocessor 200 or multiprocessor system. Here, six processing nodes are shown in multiprocessor 200. Each node comprises a L3 cache 202, 212, 222, 232, 242, 252 and four cores 204, 206, 208, 210 and 214, 216, 218, 220 and 224, 226, 228, 230 and 234, 236, 238, 240 and 244, 246, 248, 250, as well a 254, 256, 258, 260. All nodes may optionally have access to a joint L4 cache 262.

Figure 3:
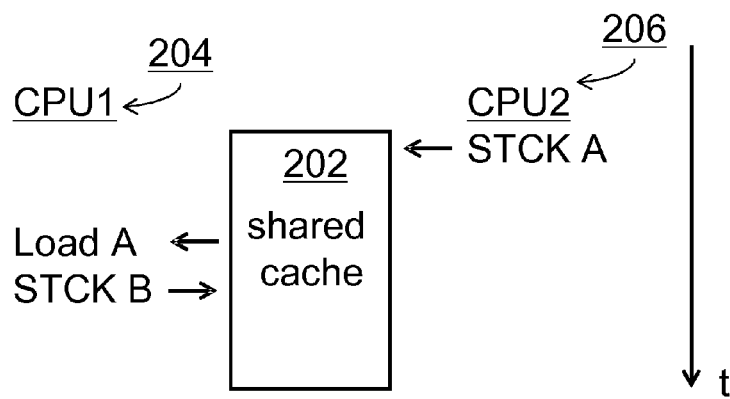
FIG. 3 shows a diagram detailing the problem to be solved.

FIG. 3 shows a diagram detailing the problem to be solved. CPU2, or core2, or processing unit 2 206 may issue an STCK instruction meaning that a TOD value A may be read from a CPU-internal register and may be written to a shared cache 202. At a later point in time—the time flow is indicated by the downwards directed arrow—CPU1 or core1 204 may load the TOD value A from the shared cache 202 into a register of CPU1 204. At an even later point in time CPU1 204 may also execute a STCK instruction. This time, a later or higher value of a TOD is to be read from the CPU1-internal TOD register.

In case of 80 CPUs in a multiprocessor system, a 64 bit TOD word-length and a CPU cycle time of 240 ps, this may not be a problem. 80 CPUs need 7 bits to differentiate between them and identify them. Hence 64 bits–7 bits=57 bits, bits 0:56, are available for a TOD counter. A TOD bit increment on bit 56 may represent 32 ns. If a TOD step or synchronization impulse may occur every 133 CPU cycles, then a fastest store from one CPU or core propagating via a load instruction on another CPU may take more than 133 processor cycles. CPU1 may have time enough to increase its own TOD counter before observing the TOD value A of CPU2. Thus, TOD B>TOD A and no problem may occur.

If, on the other side, other conditions may be given, and TOD B>TOD A may not be guaranteed, indicating an internal conflict in the multiprocessor system because the requirement for monotonically increasing TOD values is hurt. Assumed are now 144 CPUs in the multiprocessor system and a CPU clock speed of 175 ps. In this configuration only 64 bits–8 bits=56 bits, or 0:55, are available for the TOD counter because 8 bits are required to differentiate between 144 CPUs (up to 256 CPUs). A TOD step impulse may now take 357 CPU cycles. A fastest store from one CPU in a shared cache memory, propagating via a load instruction to another CPU may take less than 357 CPU cycles (about 120 cycles). Hence, TOD B<TOD A may be the result, indicating a systematical conflict in the system.

FIGS. 4(a), (b), (c) show the conflicting situation and its resolution by the proposed technique from another perspective. Assumptions made: The TOD value may be 64 bits long. More than 128 processors are used, e.g., 144 processors. Thus, 8 bits are required to differentiate between the processors. While bits 56:63 are used for processor identification, bits 0:55 are reserved for the TOD counter. Hence, as an example, an increase at the TOD counter happens at bit 55 of the TOD word, every about 1/16 μs. This may represent the shortest time interval of TOD counter values between synchronization impulses. At a processor clock speed of 5.7 GHz, this represents 356.25 processor cycles.

Figure 4:
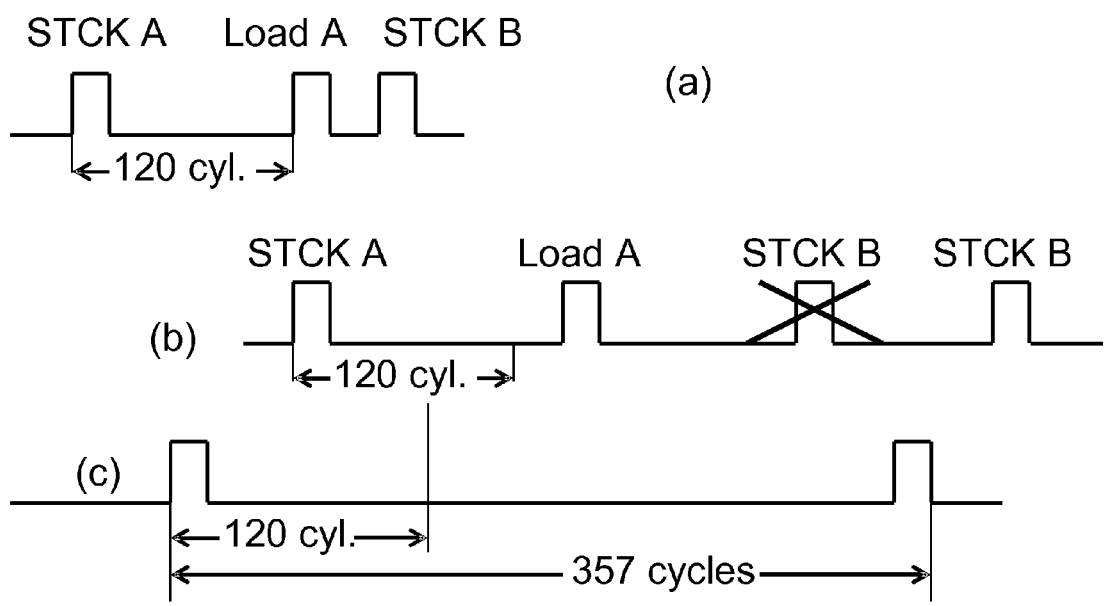
FIGS. 4(a), (b), (c) show a conflicting situation for TOD values and its resolution.

On the other side, enhancements in cache design resulting in lower cache latency and other improvements, a transfer of a value—which may happen to be a TOD value—from one processor to another processor may be achieved within about 120 processor cycles (FIG. 4(a)). This leads to the situation that after a first synchronization impulse (compare also FIG. 4(c)) a "STCK A" may happen and another processor may load that value by an instruction "Load A". If now within the same synchronization window—meaning that not a second synchronization impulse has been received—a "STCK B" by again another processor may be executed, resulting in a TOD value in the cache, a lower "STCK B" TOD value may have been written to the cache. This is to be avoided because of the requirement of monotonically increasing TOD values. Therefore, the first "STCK B" is to be suppressed, as indicated by the crossed-through "STCK B" in part (b) of FIG. 4. Only after a new synchronization impulse—which happens after about 357 processor cycles (compare FIG. 4(c))—a new "STCK B" may be allowed. This "STCK B" will generate a higher TOD value, and thus, be in line with the above mentioned monotonically increasing TOD value requirement. The "STCK B" execution may be delayed by refusing to read the TOD value required for the "STCK B" instruction. Because in a "STCK" instruction, a read command to the TOD counter as well as a write command to the shared cache memory are combined, also the write of the potentially wrong, i.e., non-monotonically increasing TOD value—may be suppressed.

Figure 5:
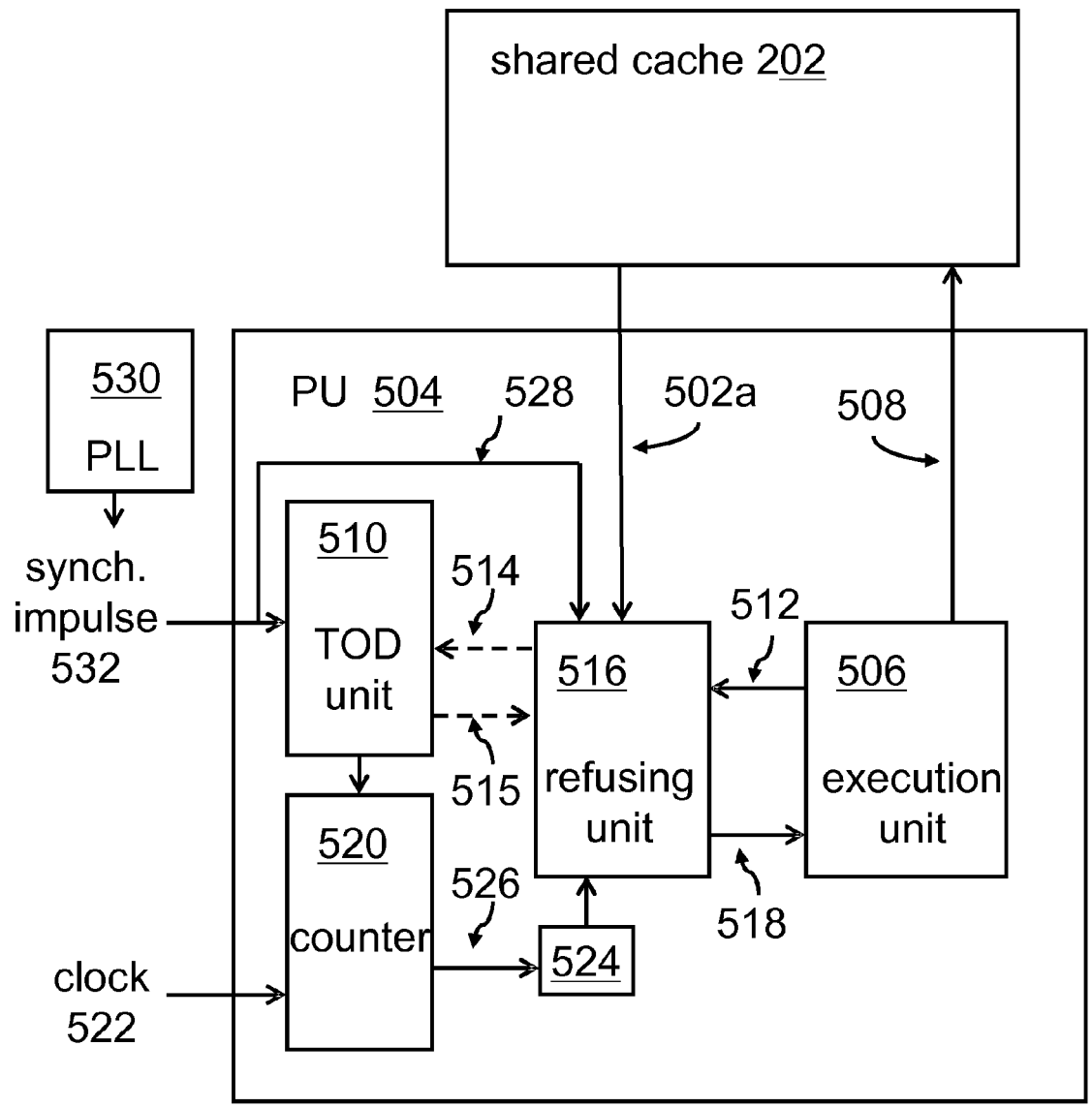
FIG. 5 shows a block diagram of a TOD synchronization system.

FIG. 5 shows a block diagram of an embodiment of a TOD synchronization system integrated into a core or processing unit 504 of a multiprocessor system. It is assumed that execution unit 506 is in the process of executing an STCK instruction, thereby writing a TOD value via line 508 into a joint cache 202 to which also other processing units may have write access. Typically, the STCK instruction consists of two parts. The first part requests the TOD value from the TOD unit 510 via lines 512, 514. This assumes that refusing unit 516 is not present. The execution unit would request and receive the TOD value via lines 512 and 518 from the TOD unit, again assuming that no refusing unit is present. The TOD unit is triggered with TOD synchronization impulses 532 by an external oscillator, typically a dedicated PLL circuit 530. This signal 532 goes to all processing units of the multiprocessor system.

Under the above described circumstances, a read of the TOD value is refused by the refusing unit 516, such that a read of the TOD value is not possible until the circumstances as explained above are met again. The refusing unit 516 receives an input signal 502a from the cache 202 that a value has been written to the cache 202 by another processing unit. This value may be a TOD value from another processing unit; however, it could also be any other value. But because of the risk that it may be a TOD value from another processing unit or core, a STCK of processing unit 506 is put on hold if the conditions, as explained above are met. For this purpose, a counter 520 is implemented. It receives clock impulses 522 or impulses for defined processor cycles from the normal processing unit clock. The counter is reset, in particular, to zero, on any synchronization impulse 532. If the predefined time required for transferring a data value from one processing unit to another via cache 202 has elapsed, the counter 520 triggers a latch 524 to set a time flag via line 526. The status of the latch is also fed to the refusing unit 516. Here, the time flag information may be combined with a trigger signal. A reject flag may be set based on the set time flag and the trigger signal coming in via line 502a, indicative of a data change in the shared cache 202.

The latch 524 is also reset on any synchronization impulse 532, as well as a potentially set reject flag via line 528. If the conditions, as explained above, are met, the refusing unit does not allow a read of a TOD value from the TOD unit 510 via line 514 and 515, respectively. Consequently, a write of a TOD value to a related cache memory is not possible if the read part of the instruction is directly linked to a write part of the same instruction, e.g. a STCK instruction. Thus, monotonically increasing TOD values written to the cache 202 may be secured.

Figure 6:
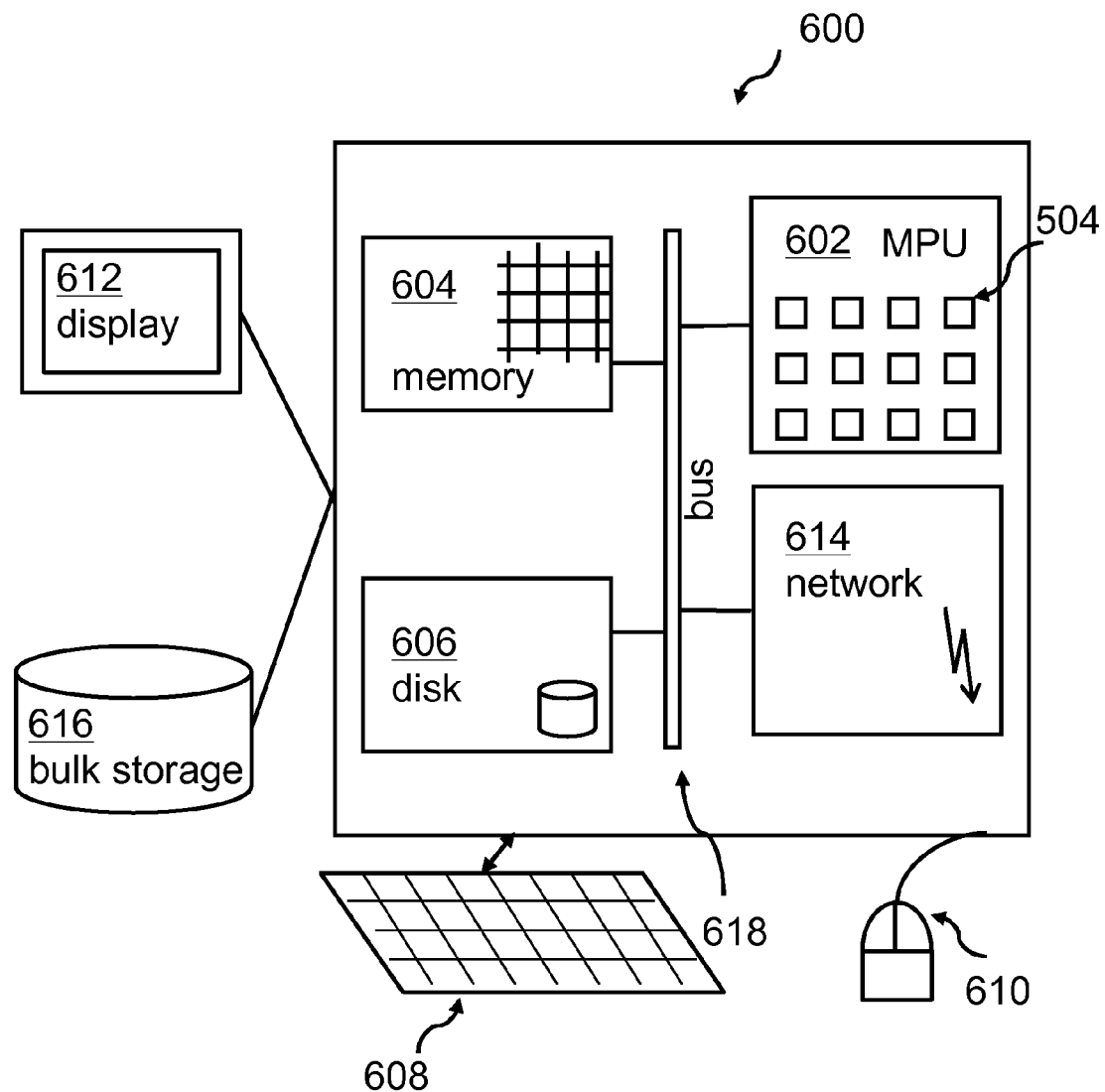
FIG. 6 shows an example of a computer system comprising the TOD synchronization system in processors of a central multiprocessor system.

Embodiments of the invention may be implemented together with virtually any type of computer, regardless of the platform being suitable for storing and/or executing program code. For example, as shown in FIG. 6, a computing system 600 may include a multiprocessor 602 with one or more nodes, each with one or more cores 504. Such a multiprocessor may also be implemented in the form as described in the context of FIG. 2. Each core may also comprise the TOD synchronization system as well as related cache memory structures as indicated by FIG. 5. Furthermore, the computing system 600 may have associated memory elements 604, an internal storage device 606 (e.g., a hard disk, an optical drive such as a compact disk drive or digital video disk (DVD) drive, a flash memory stick, etc.), and numerous other elements and functionalities, typical of today's computers (not shown). The memory elements 604 may include a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 616 for an execution. Elements inside the computer 600 may be linked together by means of a bus system 618 with corresponding adapters.

The computing system 600 may also include input means—directly or indirectly attached—such as a keyboard 608, a pointing device, such as a mouse 610, or a microphone (not shown). Alternatively, the computing system may be connected to a touch sensitive screen as input device. Furthermore, the computer 600, may include output means, such as a monitor system or screen 612 [e.g., a liquid crystal display (LCD), a plasma display, a light emitting diode display (LED), or cathode ray tube (CRT) monitor]. The computer system 600 may be connected to a network (e.g., a local area network (LAN), a wide area network (WAN), such as the Internet or any other similar type of network, including wireless networks) via a network interface connection 614. This may allow a coupling to other computer systems, or a storage network, or a tape drive. Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

While the invention has been described with respect to a limited number of embodiments, those skilled in the art, having benefit of this disclosure, will appreciate that other embodiments can be devised, which do not depart from the scope of aspects of the invention, as disclosed herein. Accordingly, the scope of aspects of the invention should be limited only by the attached claims. Also, elements described in association with different embodiments may be combined. It should also be noted that reference signs in the claims should not be construed as limiting elements.

As will be appreciated by one skilled in the art, one or more aspects may be embodied as a system, method or computer program product. Accordingly, aspects may take the form of an entire hardware embodiment, an entire software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may take the form of a computer program product, accessible from a computer-usable or computer-readable medium providing program code for use, by or in connection with a computer or any instruction execution system, or microcode. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact-disk-read-only-memory (CD-ROM), compact-disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the description herein that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments described herein and are explained with reference to the examples of embodiments, but to which the invention is not limited.

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

The block diagrams in the figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of aspects of the present invention has been presented for purposes of illustration and description, but is not intended to be exhaustive or limited to the aspects of invention in the form disclosed. Many modifications and variations will be apparent to those of ordinary skills in the art without departing from the scope and spirit of aspects of the invention. The embodiment was chosen and described in order to best explain the principles of aspects of the invention and the practical application, and to enable others of ordinary skills in the art to understand aspects of the invention for various embodiments with various modifications, as are suited to the particular use contemplated.

What is claimed is:

1. A method of generating monotonically increasing time-of-day values in a multiprocessor system, the method comprising:
   receiving synchronization impulses by a processor of the multiprocessor system; and
   refusing an execution of a read instruction of a time-of-day value within the processor of the multiprocessor system, based on the execution of the read instruction of the time-of-day value being requested after a predefined time after a synchronization impulse of the synchronization impulses, and based on a trigger signal, indicative of new data received by a related memory system, being received after the predefined time, wherein the memory system is external to the processor.

2. The method according to claim 1, wherein the predefined time is determined based on a smallest latency a data value is transferable from one processor to another processor in the multiprocessor system.

3. The method according to claim 1, further comprising:
   increasing a counter on every processor cycle time; and
   resetting the counter upon reception of the synchronization impulse.

4. The method according to claim 1, wherein a time flag is set based on a time after the synchronization impulse is reached that is equal or greater than the predefined time.

5. The method according to claim 4, wherein the time flag is reset upon reception of the synchronization impulse.

6. The method according to claim 4, wherein a reject flag is set based on the time flag being set and the trigger signal being received.

7. The method according to claim 6, wherein the execution of the read instruction of a time-of-day value is rejected based on the reject flag being set.

8. The method according to claim 6, wherein the reject flag is reset upon reception of the synchronization impulse.

9. The method according to claim 1, wherein the trigger signal is indicative of new data received in a memory system jointly accessible by the processor and another processor in the multiprocessor system.

10. The method according to claim 1, wherein the read instruction of the time-of-day value includes a write instruction of a time-of-day value.

11. A computer system for generating monotonically increasing time-of-day values in a multiprocessor system, the computer system comprising:
    a memory; and
    a processor in communications with the memory, wherein the computer system is configured to perform a method, said method comprising:
      receiving synchronization impulses by a processor of the multiprocessor system; and
      refusing an execution of a read instruction of a time-of-day value within the processor of the multiprocessor system, based on the execution of the read instruction of the time-of-day value being requested after a predefined time after a synchronization impulse of the synchronization impulses, and based on a trigger signal, indicative of new data received by a related memory system, being received after the predefined time, wherein the memory system is external to the processor.

12. The computer system according to claim 11, wherein a time flag is set based on a time after the synchronization impulse is reached that is equal or greater than the predefined time.

13. The computer system according to claim 12, wherein the time flag is reset upon reception of the synchronization impulse.

14. The computer system according to claim 12, wherein a reject flag is set based on the time flag being set and the trigger signal being received.

15. The computer system according to claim 11, wherein the read instruction of the time-of-day value includes a write instruction of a time-of-day value.

16. A computer program product for generating monotonically increasing time-of-day values in a multiprocessor system, the computer program product comprising:

a computer readable storage medium readable by a processing circuit and storing instructions for execution by the processing circuit for performing a method comprising:

receiving synchronization impulses by a processor of the multiprocessor system; and refusing an execution of a read instruction of a time-of-day value within the processor of the multiprocessor system, based on the execution of the read instruction of the time-of-day value being requested after a predefined time after a synchronization impulse of the synchronization impulses, and based on a trigger signal, indicative of new data received by a related memory system, being received after the predefined time, wherein the memory system is external to the processor.

17. The computer program product according to claim 16, wherein a time flag is set based on a time after the synchronization impulse is reached that is equal or greater than the predefined time.

18. The computer program product according to claim 17, wherein the time flag is reset upon reception of the synchronization impulse.

19. The computer program product according to claim 17, wherein a reject flag is set based on the time flag being set and the trigger signal being received.

20. The computer program product according to claim 16, wherein the read instruction of the time-of-day value includes a write instruction of a time-of-day value.

* * * * *